US010770061B2

(12) United States Patent
Hague (10) Patent No.: US 10,770,061 B2
(45) Date of Patent: Sep. 8, 2020

(54) FALSE TRIGGER CORRECTION FOR A VOICE-ACTIVATED INTELLIGENT DEVICE

(71) Applicant: Harman International Industries, Incorporated, Stamford, CT (US)

(72) Inventor: Kevin Hague, San Jose, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 146 days.

(21) Appl. No.: 16/153,712

(22) Filed: Oct. 6, 2018

(65) Prior Publication Data

US 2020/0111480 A1 Apr. 9, 2020

(51) Int. Cl.
*G10L 15/08* (2006.01)
*G10L 15/22* (2006.01)
*G10L 25/84* (2013.01)

(52) U.S. Cl.
CPC .............. *G10L 15/08* (2013.01); *G10L 15/22* (2013.01); *G10L 25/84* (2013.01); *G10L 2015/088* (2013.01); *G10L 2015/223* (2013.01)

(58) Field of Classification Search
CPC . G06F 21/32; G06F 2203/0338; G10L 15/02; G10L 15/00; G10L 25/00; G10L 25/78
See application file for complete search history.

(56) References Cited

U.S. PATENT DOCUMENTS

| 9,548,053 | B1 | 1/2017 | Basye et al. |
| 10,152,966 | B1* | 12/2018 | O'Malley ............... G10L 15/22 |
| 10,381,021 | B2* | 8/2019 | Zhang ..................... G10L 25/09 |
| 10,692,485 | B1* | 6/2020 | Grizzel ................... G06F 3/017 |
| 2006/0277049 | A1* | 12/2006 | Huang .................... G10L 15/25 704/275 |
| 2016/0360401 | A1* | 12/2016 | Guo ..................... H04L 63/0861 |
| 2017/0093910 | A1* | 3/2017 | Gukal ................. H04L 63/1416 |
| 2017/0214708 | A1* | 7/2017 | Gukal ................... G06F 16/285 |
| 2018/0130469 | A1 | 5/2018 | Gruenstein |
| 2018/0130475 | A1 | 5/2018 | Page |
| 2018/0254045 | A1* | 9/2018 | Sharifi ................. G10L 19/018 |
| 2019/0013033 | A1* | 1/2019 | Bhimanaik ............ G10L 17/06 |
| 2020/0098379 | A1* | 3/2020 | Tai .......................... G10L 13/08 |
| 2020/0098380 | A1* | 3/2020 | Tai .......................... G06F 3/167 |

\* cited by examiner

*Primary Examiner* — Linda Wong
(74) *Attorney, Agent, or Firm* — Angela M. Brunetti (57) ABSTRACT

A method for confirming a trigger in an audio input detected by a voice-activated intelligent device that listens for and detects a trigger in the audio input, confirms whether the trigger in the audio input is intended to wake the device, and if confirmed, the device is instructed to activate. If the trigger cannot be confirmed, the device is instructed to ignore the trigger. The step of confirming whether the trigger is intended to activate the device may include determining whether the audio input is human generated speech, which may also include detecting a fingerprint in the audio input.

18 Claims, 6 Drawing Sheets

FALSE TRIGGER CORRECTION FOR A VOICE-ACTIVATED INTELLIGENT DEVICE

TECHNICAL FIELD

The present disclosure is directed to a method for generating, detecting and correcting false triggers for voice-activated intelligent devices.

BACKGROUND

A voice command intelligent device is specifically designed to recognize a wake word as a gateway to its operation. The device is listening for the wake word and a user expects a quick and accurate response from the device. However, a false positive wake word may cause unintentional activation of the device. Typically, a benign event, such as the device answering a question that was not asked or recording within an environment, may occur. However, potential also exists for a more unfriendly event which may introduce privacy and security concerns.

SUMMARY

A method for continuing a trigger in an audio input detected by a voice-activated intelligent device. The audio input may be a signal voiced by a human speaker or a signal broadcast by an audio source, such as a television or radio. According to the method, the voice-activated intelligent device and/or the audio source listens for and detects a trigger in the audio input. The method confirms whether the trigger in the audio input is intended to wake the device, and if confirmed, the device is instructed to activate. If the trigger cannot be confirmed, the device is instructed to ignore the trigger. The step of confirming whether the trigger is intended to activate the device is accomplished by determining if the audio input is human generated speech, or by detecting a fingerprint, embedded in the audio input. The fingerprint may be compared to a database of stored/known fingerprint triggers, it may be detected as an inherent distortion in the audio signal that occurs as a result of the audio source transmitting the audio input. Alternatively, the fingerprint may be known at the source, detected prior to the audio source broadcasting the audio input, and instructing the voice-activated device to ignore the trigger upon detection by the voice-activated device.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

While various aspects of the present disclosure are described with reference to particular illustrative embodiments, the present disclosure is not limited to such embodiments, and additional modifications, applications, and embodiments may be implemented without departing from the present disclosure. In the figures, like reference numbers will be used to illustrate the same components. Those skilled in the art will recognize that the various components set forth herein may be altered without varying from the scope of the present, disclosure.

Any one or more of servers, receivers, or devices described herein include computer executable instructions that may be compiled or interpreted from computer programs created using a variety of programming languages and/or technologies. In general, a processor (such as a microprocessor) receives instructions, for example front a memory, a computer-readable medium or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof. Any one or more the devices herein may rely on firmware, which may require updates from time to time to ensure compatibility with operating systems, improvements and additional functionality, security updates or the like. Connecting and networking servers, receivers or devices may include, but are not limited to, SATA, Wi-Fi, lightning, Ethernet, UFS, 5G, etc. One or more servers, receivers, or devices may operate using a dedicated operating system, multiple software programs and/or platforms for interfaces such as graphics, audio, wireless networking, enabling applications, integrating hardware of vehicle components, systems, and external devices such as smart phones, tablets, and other systems to name just a few. Any one or more of the methods described herein is carried out by the processing unit that includes a non-transitory computer-readable storage medium capable of executing instructions of a software program as described above.

Figure 1:
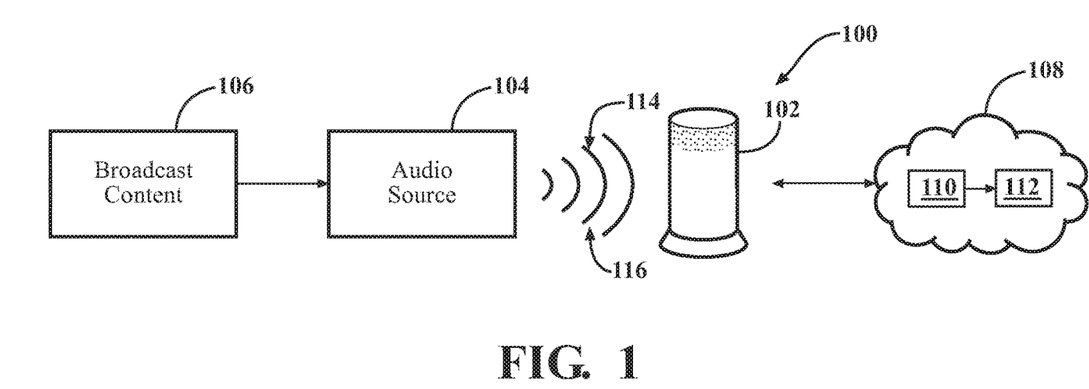
FIG. 1 is an example environment for a voice-activated intelligent device.

FIG. 1 is a block diagram 100 of a voice-activated intelligent device 102 in an example setting for which an intelligent device 102 may be falsely activated by detecting a trigger word or phrase being played by an audio source 104, for example a television. In practice, the voice-activated intelligent device is activated by a trigger, a speech command, from a user. When an audio source 104, such as a television that receives broadcast content, an audio input or audio input signal 106 is played back through speakers on the television. The playback of audio through the television may be detected by the intelligent device 102 and because the intelligent device is designed to "listen" for a trigger word or phrase in order to activate and act on a command from a user, an input from the audio source 104, that is not coming from a human, may unintentionally activate the device. In practice, the device 102 may also be in communication with a cloud-based environment such as a cloud service 108. The cloud service 108 contains an Automatic Speech Recognition (ASR) engine 110 that accesses a database 112. The database may contain known triggers, fingerprints, false-positive word combinations, commercials that are known to include trigger words and phrases, known false positive situations, and the like to be referenced by the device 102 when making a determination as to whether or not to act on a trigger word 114 or phrase 116.

Referring still to FIG. 1, the audio source 104 may broadcast a television commercial that contains a phrase 116 that may be detected as an audio input at the device 102. The phrase may contain a trigger word 114 or a trigger phrase 116, which could potentially awaken the device 102, even though the trigger word 114 or phrase 116 is actually coming from the broadcast and not from a user associated with the device 102. For example, a television commercial with a narrator speaking "Cortana is a virtual assistant for our life. It helps you through your day and eve helps you have fun." This narrated script being broadcast by the audio source 104 contains the trigger word 114 "Cortana". The trigger word may be overheard by the device 102. Also as part of the broadcasted television commercial, an actor speaks, "Hey Cortana, play the Beatles". This script being broadcast by the audio source 104 contains the trigger phrase 116, i.e., "Cortina, play the Beatles". However, the trigger word 114 or phrase 116 detected at the device 102 is not purposely directed at the device 102 with the intention of waking the device 102. However, because it contains triggers that would normally wake the device 102, the broadcast content, while unintentionally directed at the device, may cause a false trigger of the device 102. The device 102 may inadvertently detect the trigger word 114 or phrase 116, through overhearing the commercial being broadcast by the television and cause the device 102 to activate when, in fact, a user is not purposefully triggering the device 102, resulting in a false-trigger.

Figure 2A:
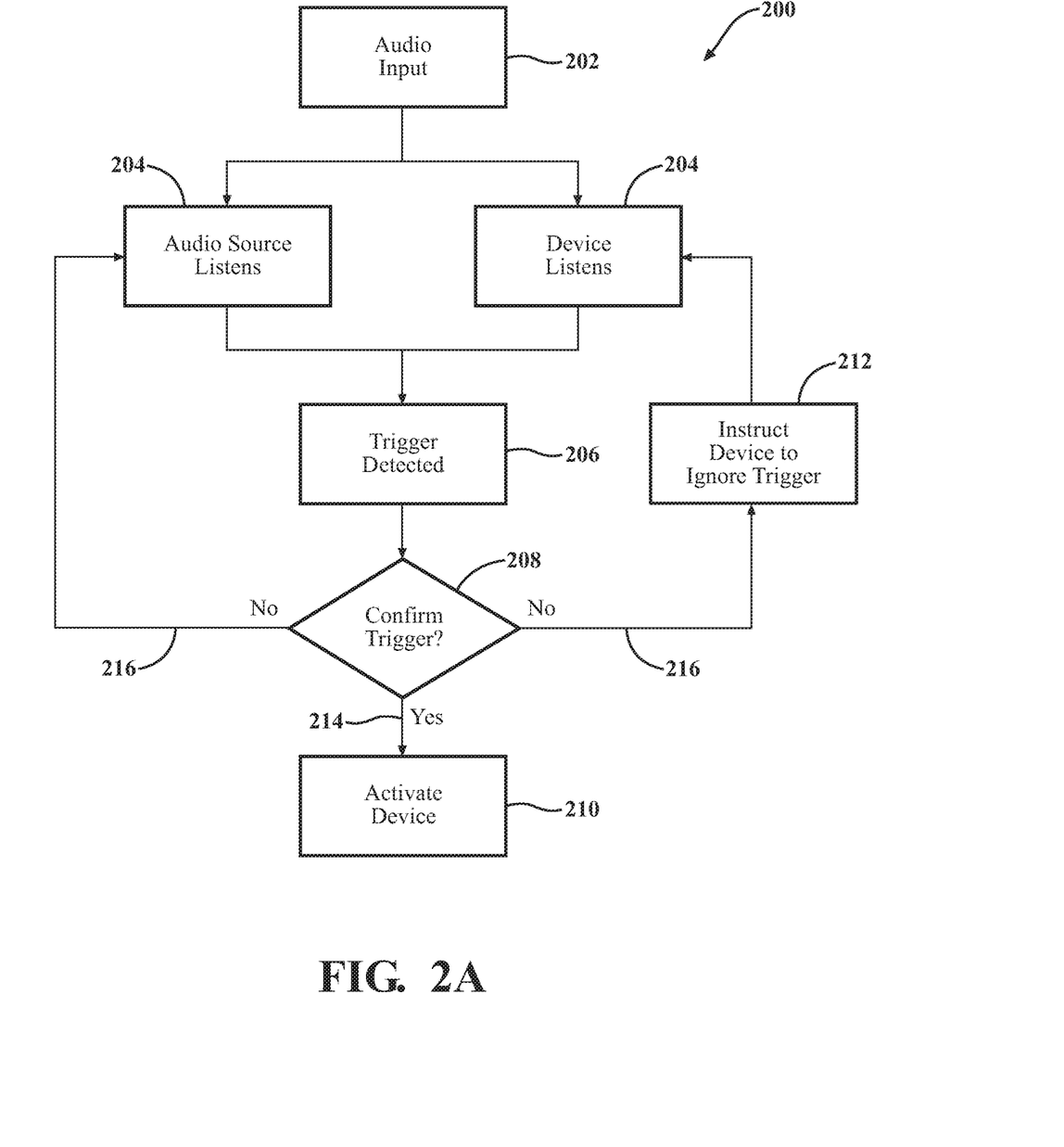
FIG. 2A is a flow chart of a method for confirming a trigger in an audio signal detected by a voice-activated intelligent device.
Figure 2B:
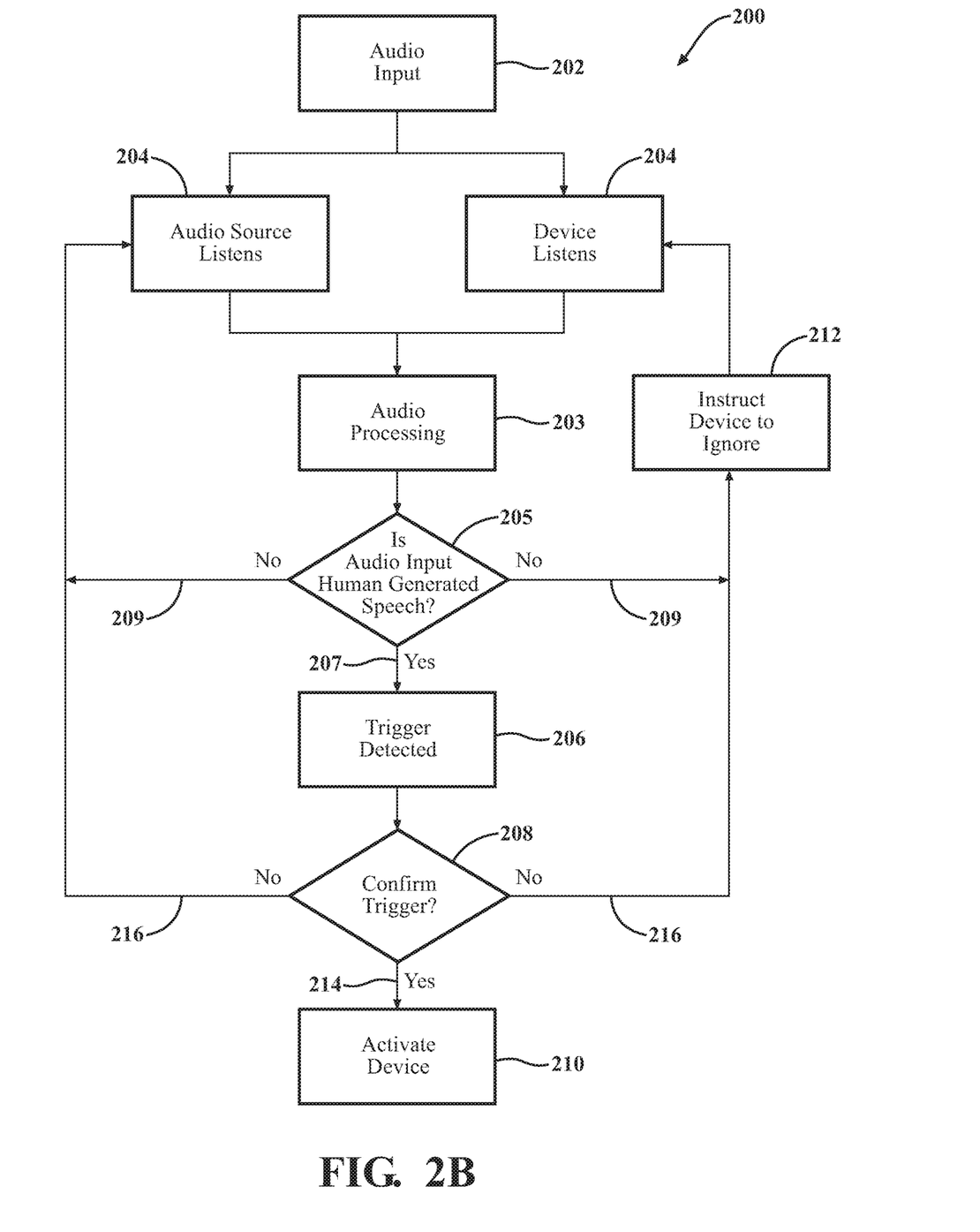
FIG. 2B is a flow chart of a method for confirming an audio input is human generated speech in a method for confirming a trigger in an audio signal detected by a voice-activated intelligent device.

In order to prevent unintentional activation of the device, a method 200, shown in FIGS. 2A and 2B, is employed. The method 200 begins with an audio input being played 202. The audio input may be spoken by a human, or played through a speaker from an audio source, such as a television or radio. The audio input may include a trigger word or phrase which may or may not be purposely directed to wake the device. An algorithm, either in the device or at the audio source, is designed to listen 204 for the trigger word or phrase.

According to an approach as described in FIG. 2A, upon hearing, or detecting 206 the trigger word or phrase, a confirmation 208 is made as to whether or not the trigger word or phrase should activate 210, or be ignored 212 by the device. In the event the trigger word or phrase is detected 206 by either the audio source or the device, a confirmation 208 is made as to whether the audio input is an intentional trigger spoken to awaken the device. In the event the audio input is confirmed 214 to be an actual trigger intended to awaken the device, the device is activated 210. In the event the audio input is not confirmed 216 to be an intentional awakening of the device, the device is instructed to ignore 212 the trigger word or phrase and the audio source and the device continue to listen 204.

According to an approach as described in FIG. 2B, audio processing 203 takes place during which a distortion analysis is performed to determine 205 whether the audio input has a source that is human generated speech. In the event the audio input has a source that is not human generated speech, the device is instructed to ignore 212 the audio input and the audio source and/or the audio device continue to listen 204 for future audio input 202. In the event the audio input is determined to be human generated speech 207, upon hearing or detecting 206 a trigger word or phrase in the audio input, a confirmation 208 is made as to whether or not the trigger word or phrase should activate 210 the device, or be ignored 216 by the device. In the event the audio input is confirmed 214 to be an actual trigger intended to awaken the device, the device is activated 210.

In either approach, a confirmation that the trigger word or phrase is intentionally spoken to awaken the device is generally determined by making a determination as to whether the audio input is a request that is spoken by a human, and is not actually an audio input that is being played from an audio source other than human generated speech, such as a television or radio audio source, in the approach described in FIG. 2B, when the determination has been made that the audio input is human generated speech, the step of detecting the trigger and confirming its source 208 upon its detection is simplified. However, there are several approaches that may be taken to accomplish the step of wake confirmation 208 and will be described in detail hereinafter.

Each of the methods described hereinafter involves confirming the trigger as intentional, or unintentional based on listening for the trigger in the audio signal and detecting a fingerprint in the audio signal. The fingerprint may be one or more of an inherent distortion in the audio signal to be described hereinafter with reference to FIG. 3. The fingerprint may be an embedded fingerprint (either pre-production or post-production) to be described hereinafter with reference to FIGS. 4A and 4B. The fingerprint may be an inaudible tone or infrared blast purposely added to the audio signal to be described hereinafter with reference to FIG. 5. The fingerprint may also be detected from a cloud-based source, predetermined and/or learned based on data stored in the cloud and actions collected from user's actions in response to audio input that was intentional or unintentional in activating the device to be described hereinafter with reference to FIG. 6.

Figure 3:
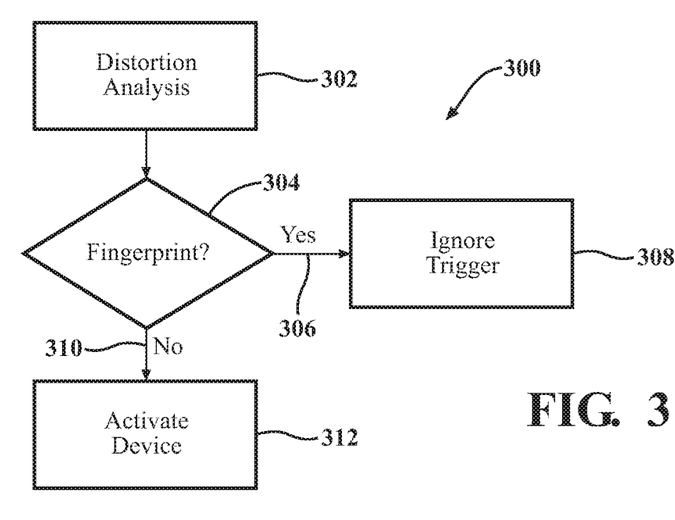
FIG. 3 is a flow chart of a method for wake confirmation of the voice-activated intelligent device.

Referring to FIG. 3, a method 300 for confirming a trigger present in an audio input is intended to wake the device is shown. The audio input contains a trigger word or phrase that is detected at either the audio source or the device, by application of the listening algorithm. Upon hearing, or detecting the trigger in the audio input, a distortion analysis is performed 302. Audio that is played by a speaker includes an inherent distortion of an audio signal which naturally occurs within a speaker. This inherent distortion leaves a fingerprint on the audio signal that may be detected, through distortion analysis performed at the audio source or at the device. A confirmation 304 of the presence of the fingerprint is performed. The presence of the fingerprint 306 is an identifier that the source of the audio signal is not human speech and therefore, is a confirmation that the audio signal is not intended to wake the device and the device is instructed to ignore the audio input 308. In the event distortion analysis does not identify the fingerprint 310, the audio input is determined to be human spoken and the device is activated 312.

Figure 4A:
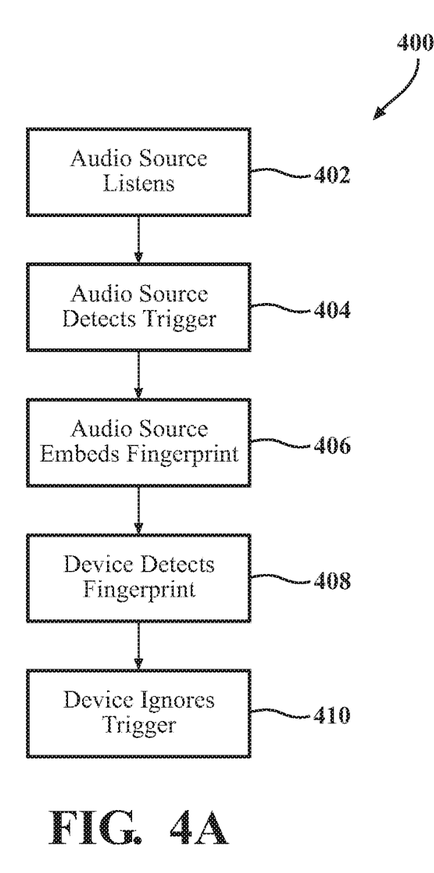
FIG. 4A is a flow chart of a method for wake confirmation of the voice-activated intelligent device.

Referring to FIG. 4A, a method 400 for confirming a trigger present in a post-production audio input is not intended to wake the device is shown. Before the device is activated, the audio source listens 402 to the audio input.

Figure 4B:
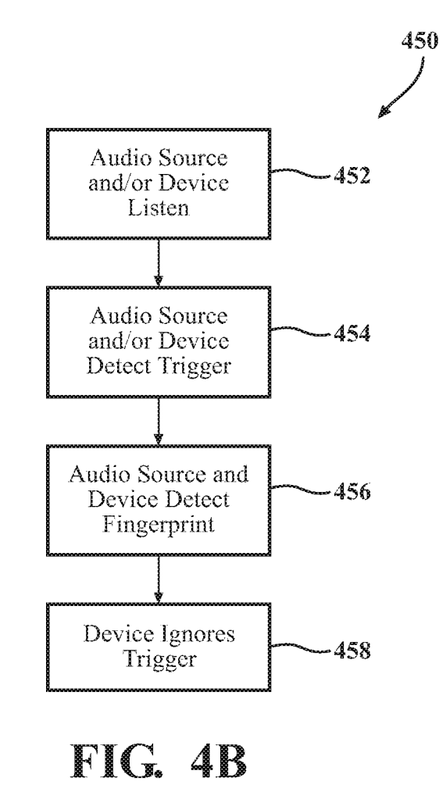
FIG. 4B is a flow chart of a method for wake confirmation of the voice-activated intelligent device.

The audio source hears, or detects, 404 the trigger present in the audio input and processes the signal to embed a fingerprint 406 in the audio input. The device detects 408 the fingerprint and ignores 410 the trigger. Referring to FIG. 4B, a method 450 for confirming a trigger is present in a pre-production audio input is shown. A fingerprint has been embedded in the audio prior to the audio input being received by and broadcast by the audio source. In a pre-production capacity, the advertiser will know when a trigger word or phrase is present in the audio of the audio stream. By placing the fingerprint in the signal prior to broadcast, the audio source and the device are prepared to detect the fingerprint. The audio source and/or the device listen 452 to the audio input. The audio source and/or the device detect 454 a trigger in the audio input. The audio source and the device detect a fingerprint embedded 456 in the audio input. The fingerprint has been embedded into the audio input in a pre-production process and is already present in the audio input, thereby passing the audio input through to the device, which also detects 458 the fingerprint and ignores 460 the trigger.

Figure 5:
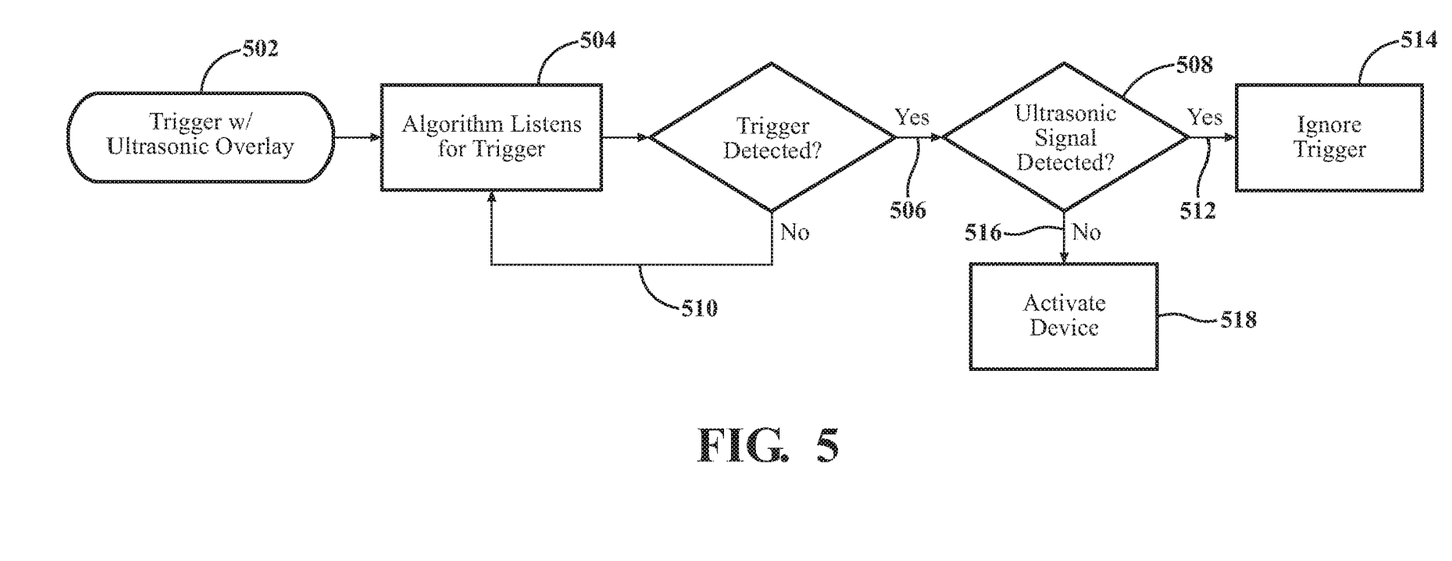
FIG. 5 is a flow chart of a method for wake confirmation of the voice-activated intelligent device.

Referring to FIG. 5, a method 500 for confirming a trigger present in an audio input is not intended to wake the device is shown, in the method shown in FIG. 5, the fingerprint is an ultrasonic signal. Similar to the method described in FIGS. 4A & 4B, the fingerprint may be inserted in the audio signal at its pre-production source and merely pass through the audio source. Alternatively, the fingerprint is an ultrasonic signal that is inserted at the audio source. In one or more embodiments, a Text-to-Speech (TTS) technology may be implemented which recognizes the trigger word in the audio signal and sends an encoding algorithm output when the replicated speech is recognized. When the audio source emits the trigger, it includes the fingerprint, and any commands or dialog related to the trigger is ignored by the device. An audio input containing a trigger and an ultrasonic overlay is played 502. An algorithm (in either the audio source or the device) listens 504 for the trigger. Upon detection of the trigger 506, an ultrasonic signal analysis is performed 508. In the absence of a detected trigger 510, the algorithm continues to listen 504. In the event the ultrasonic signal analysis recognizes an ultrasonic overlay is included with the trigger 512, the device is instructed to ignore the trigger 514. In the event the ultrasonic signal analysis does not recognize the ultrasonic overlay 516, the device is activated 518. In one or more embodiments, the ultrasonic overlay may be a simple tone or it may be a digital overlay that allows the false trigger to be detected and ignored.

Figure 6:
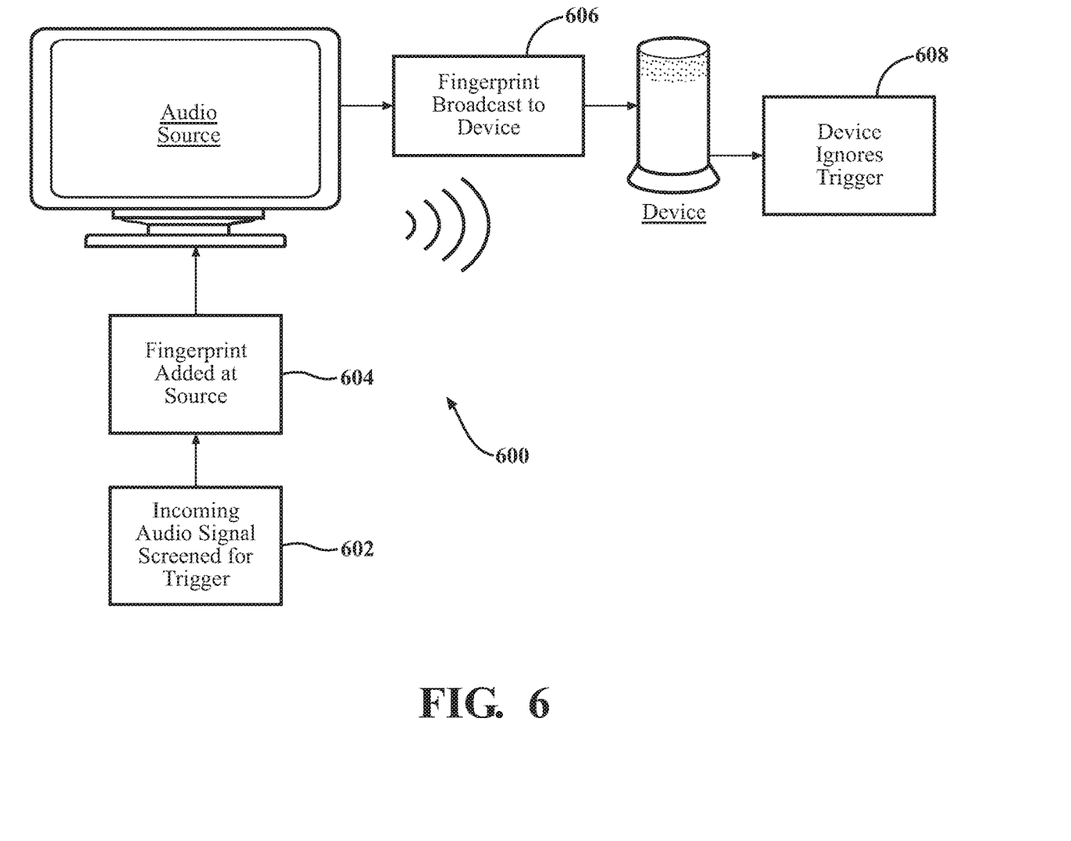
FIG. 6 is a flow chart of a method for wake confirmation of the voice-activated intelligent device.

Referring to FIG. 6, a method 600 for wake confirmation when a commercial to be broadcast is known to include a false trigger. In one or more embodiments, trigger data is added to the audio source and informs the device of the presence of a false trigger. The trigger data may be added at the audio source in several ways. For example, by way of a communication network, an infrared signal, a sub-audible tone, a visible light signal. The trigger data embedded within an audio signal being broadcast by the audio source is detected by the device and is instructed to ignore the trigger.

Referring still to FIG. 6, the method 600 for wake confirmation using a fingerprint that is embedded at the audio source. Before the device is activated, the audio input is screened 602, as it is incoming to the audio source. The audio source screens 602 the audio input by listening for a trigger. Upon detecting the trigger, a fingerprint is embedded 604 within the audio input, by the audio source, to identify the trigger within the audio input as a false trigger. The audio input, including the fingerprint is broadcast 606 by the audio source. Therefore, when the fingerprint is detected at the device, the device is instructed to ignore the trigger 608 and is not activated.

Figure 7:
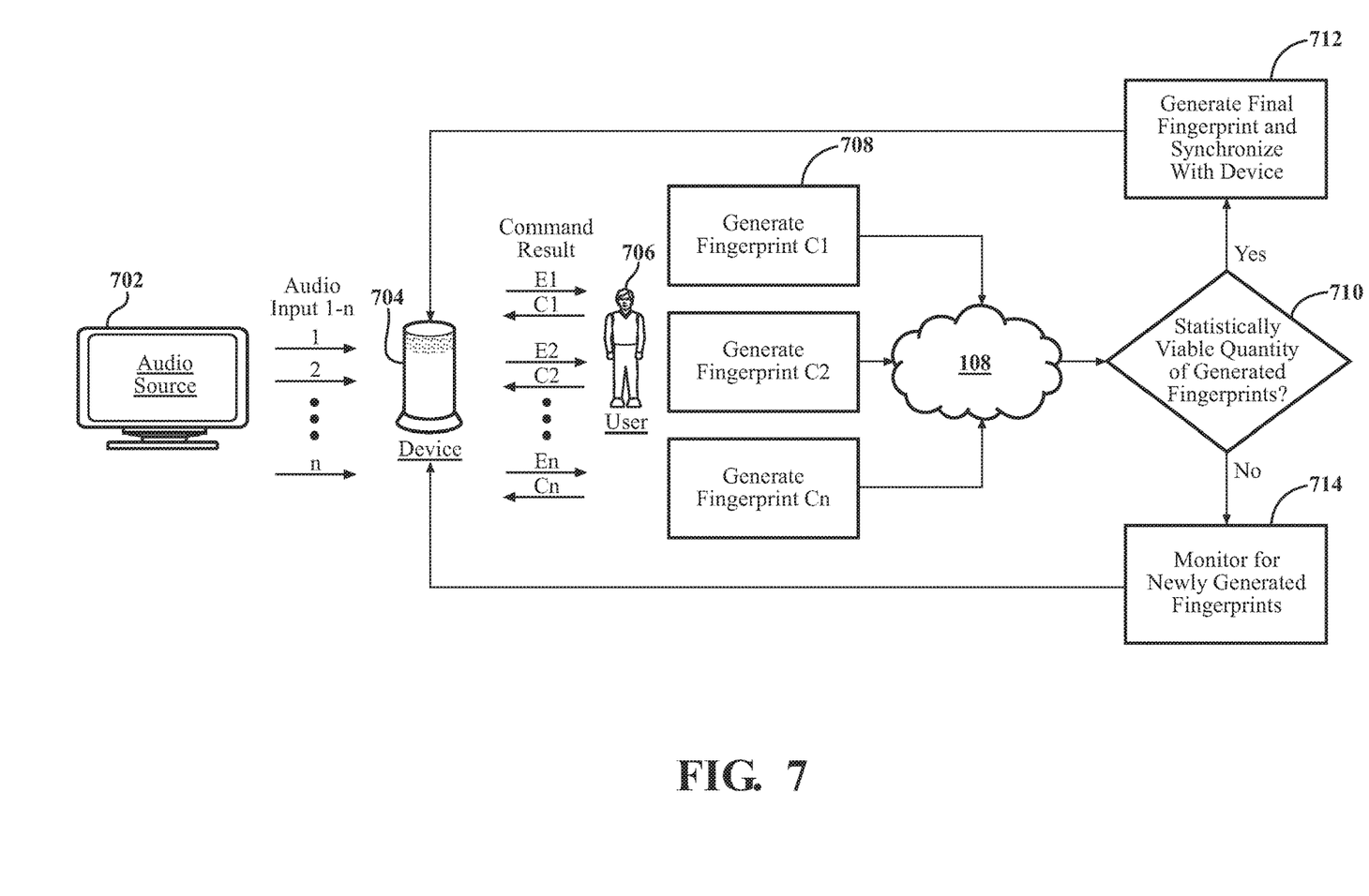
FIG. 7 is a flow chart of a method for improving any one or more methods of confirming a trigger for a voice-activated intelligent device.

FIG. 7 shows a method 700 for improving the accuracy and efficiency of wake confirmation using a fingerprint as described in one or more embodiments referenced in FIGS. 1-6. The method 700 uses information and data gathered from a plurality of audio inputs (1, 2 . . . n) played by an audio source 702 and received by an audio device 704 that result in a cancellation (C1, C2 . . . Cn) of activation (E1, E2 En) of the device 704 by a user 706. Each cancellation (C1, C2 . . . C3) results in the generation 708 of a fingerprint associated with the audio input (1, 2 . . . n). The information gathered about the cancellations (C1, C2 . . . Cn) is collected in a cloud-based service 108 and is statistically analyzed 710. Based on the results of the statistical analysis 710, a final fingerprint is generated and synchronized 712 with the device 704. The identification, tracking and correction of false triggers will result in a decrease, or elimination, of unintentional activation of the device. In the event a statistically viable quantity of generated fingerprints is not met, the method 700 continues to monitor 714 for newly generated fingerprints that occur based on commands to cancel activation of the device by a user.

In the foregoing specification, the present disclosure has been described with reference to specific exemplary embodiments. Various modifications and changes may be made, however, without departing from the scope of the present disclosure as set forth in the claims. The specification and figures are illustrative, rather than restrictive, and modifications are intended to be included within the scope of the present disclosure. Accordingly, the scope of the present disclosure should be determined by the claims and their legal equivalents rather than by merely the examples described.

For example, the steps recited in any method or process claims may be executed in any order and are not: limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including" "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present disclosure, in addition to those not specifically recited, may be varied or otherwise particularly adapted to specific environments, manufacturing specifications, design parameters or other operating requirements without departing from the general principles of the same.

The invention claimed is:

1. A method for confirming a trigger for a voice-activated intelligent device, the method carried out on a device having a processing unit, including a non-transitory computer-readable storage medium, capable of executing instructions of a software program, the method comprising the steps of:
- listening for a trigger in an audio input;
- upon hearing the trigger, performing a wake confirmation by detecting a fingerprint in the audio input, performing a wake confirmation further comprises;
    - monitoring, in a cloud-based environment, occurrences of a user canceling a command at the voice-activated intelligent device that was the result of a false trigger;
    - generating a fingerprint to associate the trigger in the audio input with a false trigger for each occurrence of a user canceling a command that was the result of the false trigger;
    - performing a statistical analysis on the generated fingerprints;
    - upon identification of a statistically viable quantity of generated fingerprints, generating a final fingerprint that defines the trigger as a false trigger;
    - synchronizing the final fingerprint to the voice-activated intelligent device to detect and identify the trigger as false in subsequent audio inputs that contain the trigger; and
- upon confirmation that the audio input contains a trigger and a final fingerprint, instructing the voice-activated intelligent device to ignore the audio input.

2. The method as claimed in claim 1 wherein the step of performing a wake confirmation further comprises the step of comparing, in a cloud-based environment, the trigger heard in the audio input to a database of triggers known to be false.

3. The method as claimed in claim 1 wherein the step of performing a wake confirmation further comprises the step of comparing, in a cloud-based environment, the fingerprint detected in the audio input to a database of known fingerprints.

4. The method as claimed in claim 1 wherein the step of performing a wake confirmation further comprises the step of detecting a fingerprint embedded in the audio input to indicate the audio input contains a false trigger.

5. The method as claimed in claim 1 wherein the step of detecting a fingerprint embedded in the audio input further comprises detecting a fingerprint embedded in the audio input at its source.

6. The method as claimed in claim 5 wherein the step of detecting the fingerprint embedded in the audio input is performed at the audio source.

7. The method as claimed in claim 5 wherein the step of detecting the fingerprint embedded in the audio input is performed at the voice-activated intelligent device.

8. The method as claimed in claim 1 wherein the step of detecting a fingerprint embedded in the audio input further comprises detecting, at the voice-activated intelligent device, a fingerprint embedded by the audio source.

9. The method as claimed in claim 8 wherein the fingerprint embedded by the audio source is selected from the group consisting of: an ultrasonic signal, a sub-audible tone, an infrared signal, identification of an inherent distortion in the audio input that occurs as a result of the audio source transmitting the audio input.

10. A method for detecting a false trigger in an audio signal detected by a voice-activated intelligent device, the method carried out on a device having a processing unit, including a non-transitory computer-readable storage medium, capable of executing instructions of a software program, the method comprising the steps of:
- receiving an audio input signal at an audio source;
- prior to broadcasting the audio input signal, performing a wake confirmation in a processing unit associated with the audio source by detecting a false trigger in the audio input, performing a wake confirmation further comprises;
    - monitoring, in a cloud-based environment, occurrences of a user canceling a command at the voice-activated intelligent device that was the result of a false trigger;
    - generating a fingerprint to associate the trigger in the audio input with a false trigger for each occurrence of a user canceling a command that was the result of the false trigger;
    - performing a statistical analysis on the generated fingerprints;
    - upon identification of a statistically viable quantity of generated fingerprints, generating a final fingerprint that defines the trigger as a false trigger;
    - synchronizing the final fingerprint to the voice-activated intelligent device to detect and identify the trigger as false in subsequent audio inputs that contain the trigger;
- upon detecting a false trigger in the audio input, the audio source communicates a fingerprint to the voice-activated intelligent device;
- detecting the fingerprint at the voice-activated intelligent device; and
- ignoring the audio input at the voice-activated intelligent device.

11. The method as claimed in claim 10 wherein the step of detecting a false trigger further comprises identifying a fingerprint embedded in the audio input signal during pre-production and known by the audio source.

12. The method as claimed in claim 10 wherein the step of detecting a false trigger further comprises performing distortion analysis that recognizes inherent distortion that is caused by replicated speech.

13. The method as claimed in claim 10 wherein the step of communicating a fingerprint to the voice-activated intelligent device further comprises embedding a fingerprint in the audio signal to be detected at the voice-activated intelligent device.

14. The method as claimed in claim 13 wherein the step of embedding a fingerprint in the audio signal further comprises applying an ultrasonic overlay to the audio signal.

15. The method as claimed in claim 13 wherein the step of embedding a fingerprint in the audio signal further comprises inserting a sub-audible tone into the audio signal.

16. The method as claimed in claim 13 wherein the step of embedding a fingerprint in the audio signal further comprises inserting an infrared blast into the audio signal.

17. A method for confirming a trigger for a voice-activated intelligent device, the method carried out on a device having a processing unit, including a non-transitory computer-readable storage medium, capable of executing instructions of a software program, the method comprising the steps of:
- listening for an audio input;
- performing distortion analysis of the audio input to determine if the source of the audio input is human generated speech;
- upon determining the source of the audio input is human generated speech, listening for a trigger in the audio input;

upon determining that the source of the audio input is human generated speech and contains the trigger, activating the voice-activated intelligent device; and upon determining the source of the audio input is not human generated speech and contains the trigger, ignoring the trigger at the voice-activated intelligent device.

18. The method as claimed in claim 17 wherein the step of processing the audio input to determine if the audio input is human generated speech further comprises detecting a fingerprint in the audio input that indicates the audio input is not human generated speech.

\* \* \* \* \*